United States Patent
Toriyama

(12) 
(10) Patent No.: US 6,798,913 B2
(45) Date of Patent: Sep. 28, 2004

(54) IMAGE PROCESSING DEVICE AND IMAGE PROCESSING PROGRAM

(75) Inventor: Hideyuki Toriyama, Toyokawa (JP)

(73) Assignee: Minolta Co., Ltd., Osaka (JP)

(*) Notice: Subject to any disclaimer, the term of this patent is extended or adjusted under 35 U.S.C. 154(b) by 650 days.

(21) Appl. No.: 09/809,205

(22) Filed: Mar. 16, 2001

(65) Prior Publication Data

US 2001/0026640 A1 Oct. 4, 2001

(30) Foreign Application Priority Data

Mar. 27, 2000 (JP) ........................................ 2000-087191

(51) Int. Cl.[7] ................................................ G06K 9/72
(52) U.S. Cl. ...................... 382/229; 358/462; 382/175; 382/176; 382/190; 715/521; 715/529; 715/531
(58) Field of Search .................. 382/173, 175–176, 382/190, 199, 203, 229; 701/509, 517; 358/462; 715/521, 529, 531

(56) References Cited

U.S. PATENT DOCUMENTS 5,465,304 A * 11/1995 Cullen et al. ............... 382/176
5,774,579 A * 6/1998 Wang et al. ................ 382/176
6,009,196 A * 12/1999 Mahoney .................... 382/176
6,628,833 B1 * 9/2003 Horie ......................... 382/173

FOREIGN PATENT DOCUMENTS

| JP | 62-159570 | 7/1987 |
| JP | 5-153371 | 6/1993 |
| JP | 5-328096 | 12/1993 |

* cited by examiner

Primary Examiner—Bhavesh M. Mehta
Assistant Examiner—Gregory M Desire
(74) Attorney, Agent, or Firm—Morrison & Foerster LLP

(57) ABSTRACT

An image processing device and a computer program product capable of accurately determining a user-desired region even when a region has been only roughly marked by a user, wherein a specific region within an image to be processed is detected; the image to be processed is allocated into a plurality of blocks; text included in the image to be processed is recognized; it is determined based on a result of text recognition that presence and absence of relevance between a first block which is partially included in the specific region and a second block which is entirely included in the specific region among the allocated blocks; and it is determined whether or not an image of the first block should be treated as an image belonging to the specific region in accordance with a result of determination as to the relevance.

18 Claims, 11 Drawing Sheets

に相互に結合する。すなわち1ターンのコイルがトランスとして作用する。また、線間には容量成分があり結合する。2つの素子は接近して配置されることによって複雑に影響し合う。1方の出力信号が他方の入力側に正帰還されると発振しノイズとなる。入力回路に流れる電流は小さいからゲート端子に数10Ωの抵抗を直列に接続すれば発振を抑制できる。また閉ループ内の一部、例えばゲートにフェライトビーズを通してインダクタンスを付加し、振動周波数を低下させてもノイズの抑制に有効である。

(2) トランジスタの並列接続
パワー回路ではトランジスタの電流容量を増加させるために、しばしば並列(パラ)接続する。図7にパワーMOSFETを2パラした等価回路を示す。

IMAGE PROCESSING DEVICE AND IMAGE PROCESSING PROGRAM

RELATED APPLICATION

This application is based on Patent Application No. 2000-87191 filed in Japan on Mar. 7, 2000, the entire content of which is hereby incorporated by reference.

BACKGROUND OF THE INVENTION

1. Field of the Invention

The present invention relates to an image processing device and image processing program, and specifically relates to an image processing device for performing specific image processing of specific regions within an image and processing of regions outside the specific regions.

2. Description of the Related Art

Image processing devices have been proposed which perform specific image processing of specific regions within an image and processing of regions outside the specific regions. Such image processing pertains to image processing called trimming wherein the image belonging to a specific region remains after the image belonging to regions other than the specific region are erased, or, conversely, image processing called masking wherein the image belonging to a specific region is erased and the image of other regions outside the specific region remain.

An image processing device having such a trimming function is disclosed, for example, in Japanese Laid-Open Patent Application No. S62-159570, describing an image processing device which reads a document image of a newspaper or the like together with a desired region within the document image which has been marked by a circumscribing mark made by a felt pen beforehand using an image reading means, recognizes the circumscribing mark by a circumscribing mark recognizing means, and erases the image belonging to the exterior side of the circumscribing mark.

Japanese Laid-Open Patent Application Nos. H5-328096 and H5-153371 disclose image processing devices which perform a trimming process wherein an image within a specified region is formed by moving and rearranging the image within the specified region and trimming unnecessary parts.

In the case of the former device, however, the specifying operation is troublesome inasmuch as the contour of a desired region must be accurately marked when applying the circumscribing mark using a felt pen or the like because the trimming operation is performed in faithful accordance with the circumscribing mark.

In the case of the latter devices, although forming of the image within a specified region is considered, the image outside the specified region is erased unconditionally. For this reason great accuracy in specifying the desired region is required, and the specifying operation is troublesome.

OBJECTS AND SUMMARY

A object of the present invention is to provide an improved image processing device and image processing program which eliminate the aforesaid disadvantages.

Another object of the present invention is to provide an image processing device and image processing program capable of accurately determining a user-desired region even when a region has been only roughly specified.

These objects are attained by providing an image processing device comprising:

a detector for detecting a specific region within an image to be processed;

an image allocator for allocating the image to be processed into a plurality of blocks;

a text recognizing unit for recognizing text included in the image to be processed;

a first determining unit for, on the basis of a recognition result of the text recognizing unit, determining presence and absence of relevance between a first block which is partially included in the specific region and a second block which is entirely included in the specific region among a plurality of blocks allocated by the image allocator; and a second determining unit for determining whether or not an image of the first block should be treated as an image belonging to the specific region in accordance with a determination result of the first determining unit.

This image processing device may be provided with an image processor for performing specific image processing on the specific region or regions outside the specified region based on a determination result of the second determining unit. This specific image processing may be, for example, erasure of the image.

In this image processing device, the first determining unit, more specifically, determines whether or not a context is appropriate between an article comprised of text belonging to the first block and an article comprised of text belonging to the second block, and determines there is relevance between the first block and the second block when the context is appropriate. Even more specifically, the first determining means has a dictionary recording a plurality of words and phrases, and determines the context is appropriate when a word or phrase straddling across a final or leading text line belonging to the first block and a leading or final text line belonging to the second block matches any words and phrases recorded in the dictionary.

In this image processing device the second determining unit determines that the image of the first block should be treated as the image belonging to the specific region when the first determining unit has determined there is relevance between the first block and the second block.

In this image processing device it is desirable that the image allocator allocates the image to be processed based on lines or white spaces within the image to be processed.

In this image processing device the detector may detect a closed region circumscribed by a line of specific color within the image to be processed as the specific region.

This image processing device also may be provided with an image reader for reading a document image to obtain data of the image to be processed.

BRIEF DESCRIPTION OF THE DRAWINGS

These and other objects and features of the present invention will become clear from the following description taken in conjunction with the preferred embodiments thereof with reference to the accompanying drawings, in which:

FIG. 13 illustrates the image ultimately obtained by the inter block relevance process on the image of FIG. 12.

DETAILED DESCRIPTION OF THE PREFERRED EMBODIMENTS

The preferred embodiments of the present invention are described hereinafter with reference to the accompanying drawings.

Figure 1:
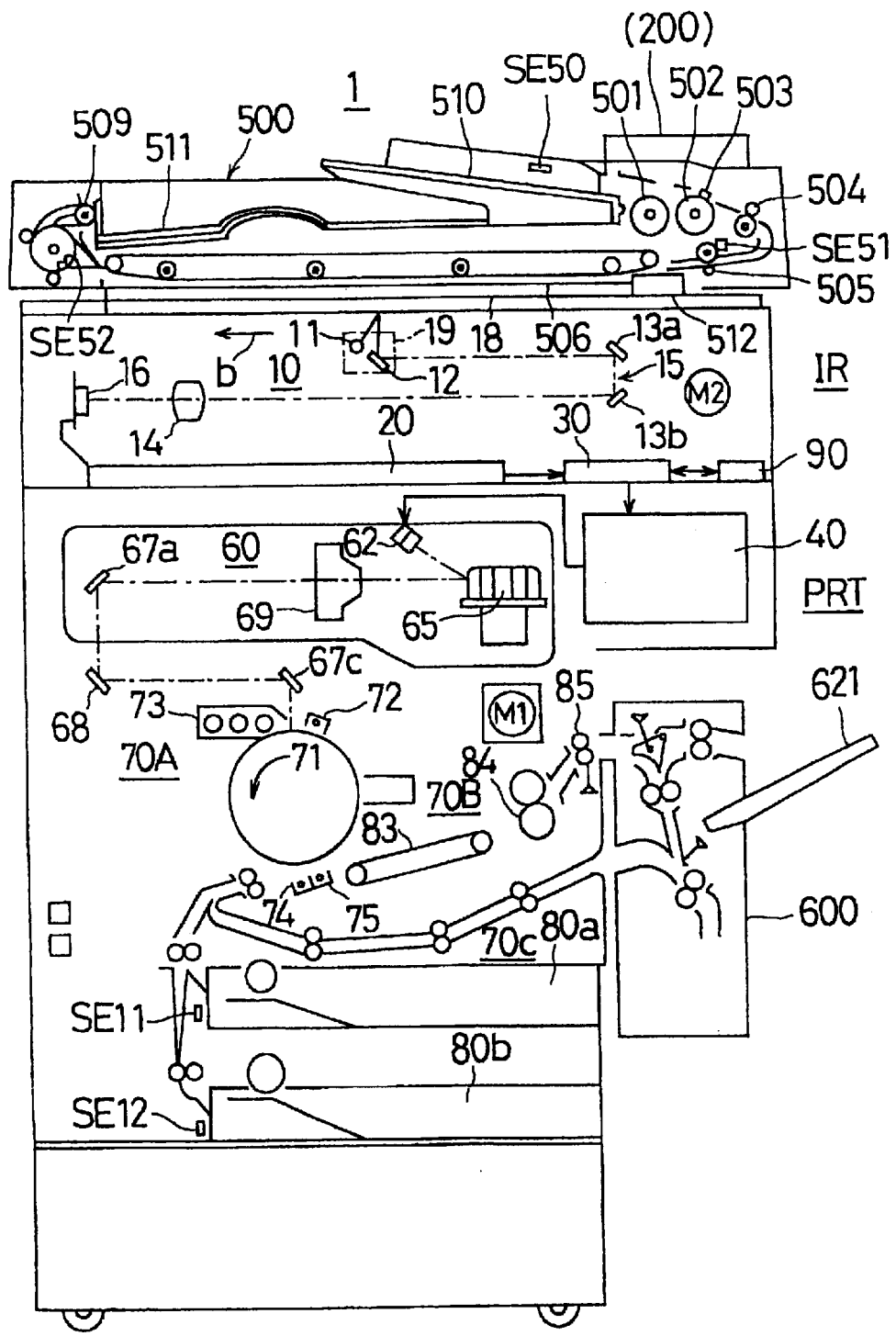
FIG. 1 briefly shows the structure of a digital copier of an embodiment of the present invention.

FIG. 1 briefly shows the structure of a copier 1 incorporating the image processing device of the present invention. As shown in FIG. 1, the copier 1 is a digital copier provided with an image reader IR and a page printer PRT.

The image reader IR comprises a scanner 10, image signal processor 20, memory unit 30 having an image memory 31 (refer to FIG. 2), and a trimming processor 90. The image reader IR reads the image of a document placed on a document table 18, and generates image data corresponding to each pixel of the document image. A first scanner 19 having an exposure lamp 11 and a first mirror 12, and a second scanner 15 having a second mirror 13a and a third mirror 13b are driven by a scanner motor M2, so as to move in the arrow b direction (subscan direction). The light emitted from the exposure lamp 11 is reflected by the document on the document table 18, and impinges a line sensor 16 via mirrors 12, 13a and 13b, and a lens 14. The line sensor 16 has a plurality of photoelectric conversion elements (CCD) arrayed along a direction (a main scan direction) perpendicular to the sheet surface of FIG. 1, and outputs image data corresponding to each pixel. The line sensor 16 is capable of scanning a document image in a sub scan direction by moving the first scanner 19 and the second scanner 15 in the arrow b direction. A sensor (not illustrated) detects whether or not the first scanner 19 is set at the home position.

The image data output from the line sensor 16 are converted to digital multi-level data in the image signal processor 20. The converted data are subjected to various well-known image processing such as shading correction, variable magnification movement processing, background level correction, edge enhancement, smoothing and the like, and thereafter temporarily stored in the image memory 31 within the memory unit 30.

The trimming processor 90 performs a trimming process described later on the image data stored in the image memory 31 when a trimming process is specified by a user operating the operation panel 200. The trimming processed image data are subsequently output to a print processor 40 of the printer PRT.

An automatic duplex document feeder (ADFR) 500, which is a peripheral device also functioning as a document cover provided, is assembled on the top of the main body of the image reader IR so as to be openable by pivoting on the back end of the ADFR 500. The ADFR 500 transports a document set on a document stack 510 onto the document table 18 by means of a feed roller 501, guide roller 502, guide pad 503, intermediate roller 504, registration roller 505, and transport belt 506, and after the document is read by the image reader IR, ejects the document onto a document discharge tray 511 via a discharge roller 509. The ADFR 500 is provided with a document scale 512, document sensor SE50 for sensing the presence of a document, document size sensor SE51, and discharge sensor SE52. Reference number 200 in FIG. 1 refers to the operation panel.

The page printer PRT is provided with a print processor 40 for outputting exposure control signals, print head 60 having a semiconductor laser 62 as a light source, development/transfer system 70A including a photosensitive drum 71 and peripheral devices, fixing/discharge system 70B including a fixing roller 84 and discharge roller 85, and a sheet transporting system 70C of the recirculation type including a re-feeding unit 600. The page printer PRT prints an image via an electrophotographic process based on image data transmitted from the image reader IR. Below the page printer PRT are provided two cassettes 80a and 80b capable of accommodating several hundred sheets of paper, two paper size sensors SE11 and SE12, and take-up rollers.

A laser beam emitted from the semiconductor laser 62 is deflected in travel direction to the main scan direction by a polygonal mirror 65. The deflected laser beam is directed to an exposure position on the photosensitive drum 71 by a lens 69, and mirrors 67a, 67b, 67c of various types. The surface of the photosensitive drum 71 is uniformly charged by a charger 72. A latent image formed on the drum 71 by the exposure to the laser beam is developed as a toner image by a developing device 73. At the transfer position, the toner image is transferred onto a sheet by a transfer charger 74. The sheet bearing the transferred toner image is separated from the photosensitive drum 71 by a separation charger 75, and subsequently is transported via a transport belt 83, fixing roller 84, and discharge roller 85 and deposited with the image facing upward on a discharge tray 621.

Figure 2:
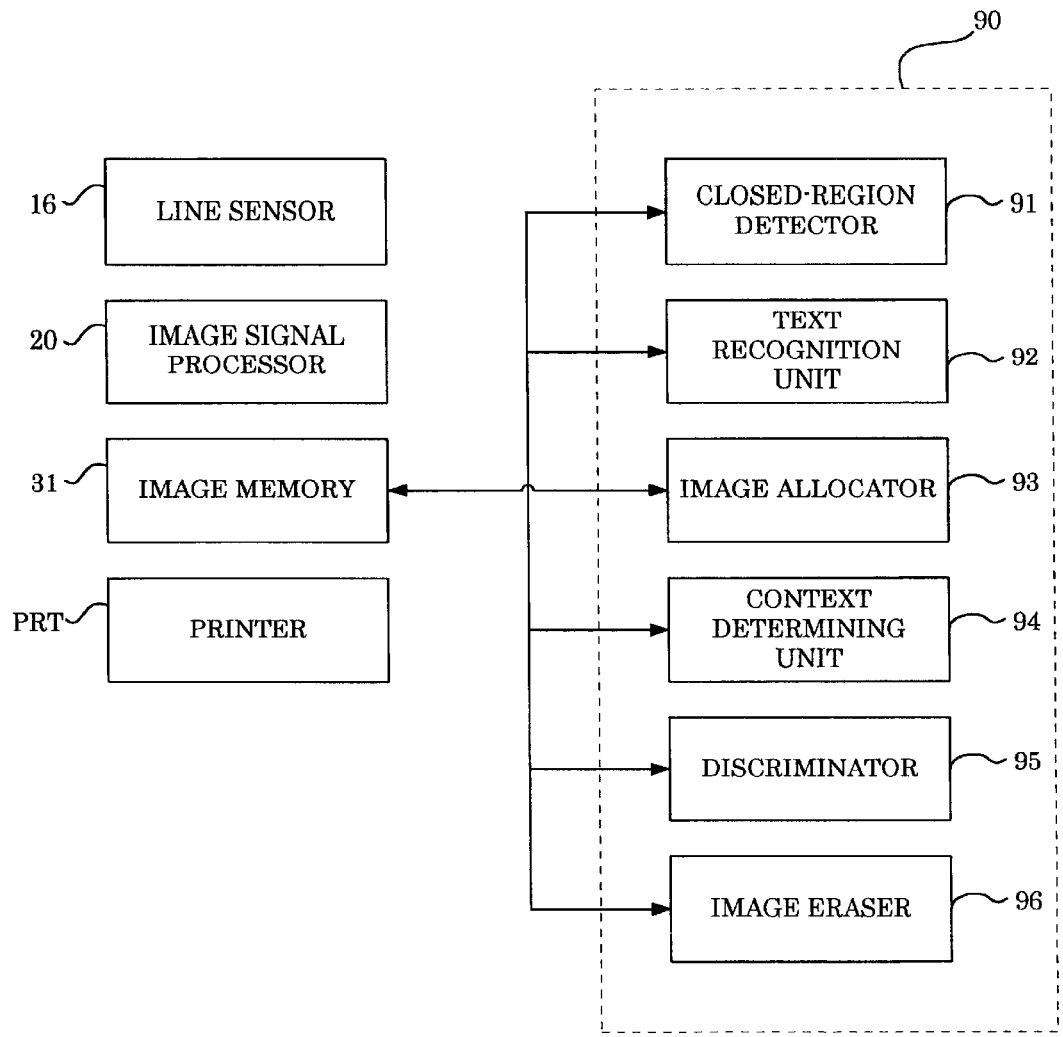
FIG. 2 is a block diagram showing the electrical structure of the essential parts of the digital copier.

FIG. 2 is a block diagram showing the electrical structure of the essential part of the digital copier 1 of FIG. 1.

As previously mentioned, the digital copier 1 is provided with a CCD line sensor 16, image signal processor 20, memory 31 built in the memory unit 30, and a page printer PRT having a print processor 40, and is further provided with a trimming processor 90 for performing a trimming process.

To perform a trimming process, the user operates the operation panel 200 to specify the trimming mode, and the image reader IR reads a document having a circumscribing mark M (refer to FIGS. 6 and 10) around a desired region in the document image made using a marker such as a felt pen or the like.

The image data read by the line sensor 16 are transmitted to the image signal processor 20. As previously mentioned, in the image signal processor 20 the image data are converted to digital multi-level data, and subjected to various image processing such as shading correction, variable magnification movement processing, background level correction, edge enhancement, and smoothing, and thereafter the image data are temporarily stored in the image memory 31.

The trimming processor 90 performs a trimming process to retain the image belonging to the specified region (hereinafter referred to as "trimming region") within the document, and erases the image belonging to the region outside the specified region. The trimming processor 90 is provided with a closed-region detector 91, text recognition unit 92, image allocator 93, context determining unit 94, discriminator 95, and image eraser 96.

The closed-region detector 91 extracts a linear region marked using a marker of special color (previously referred to as "circumscribing mark M") from image data stored in the image memory 31, and detects the closed-region R circumscribed by the linear region as the trimming region.

The text recognition unit 92 extracts the text information as a word-by-word image from image data stored in the image memory 31, and refers to a built-in dictionary to recognize the text.

Figure 6:
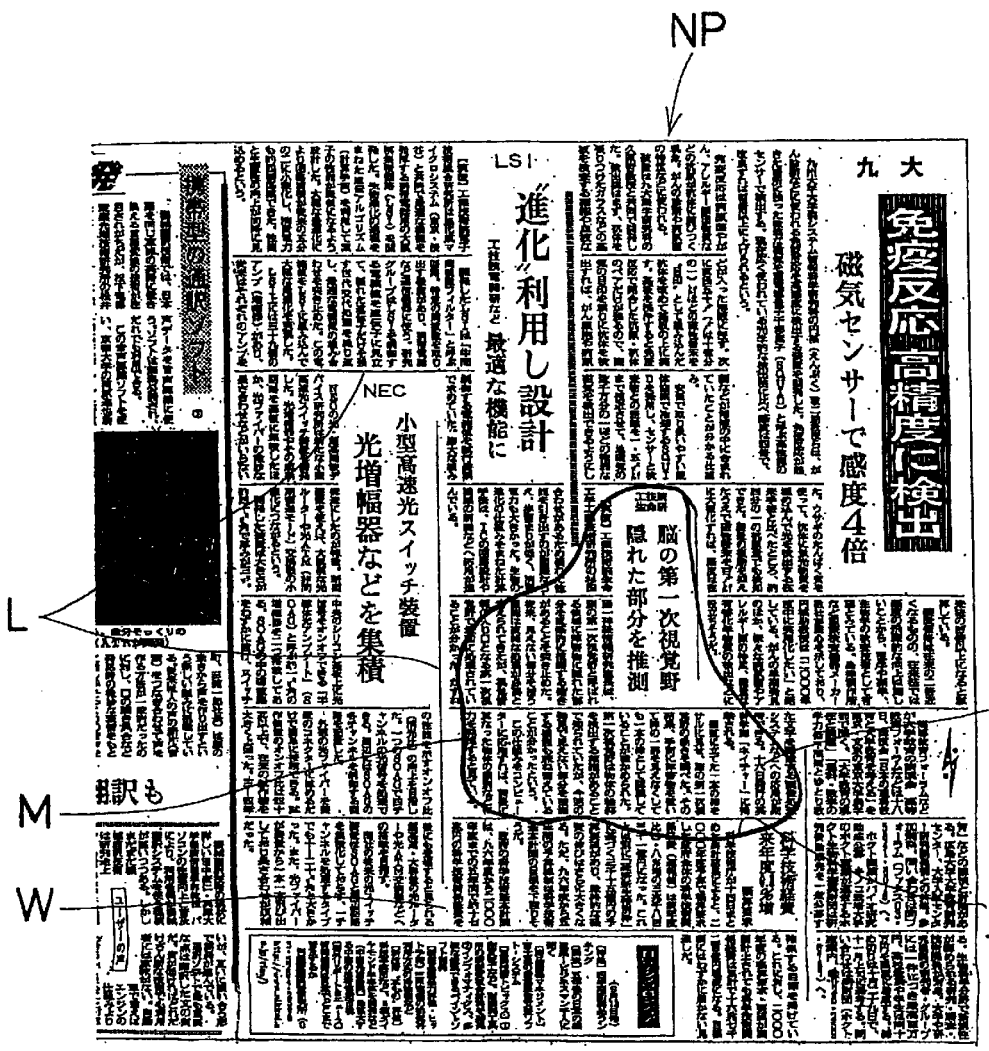
FIG. 6 illustrates the trimming region specification state of a first example of the trimming process of the present invention.
Figure 10:
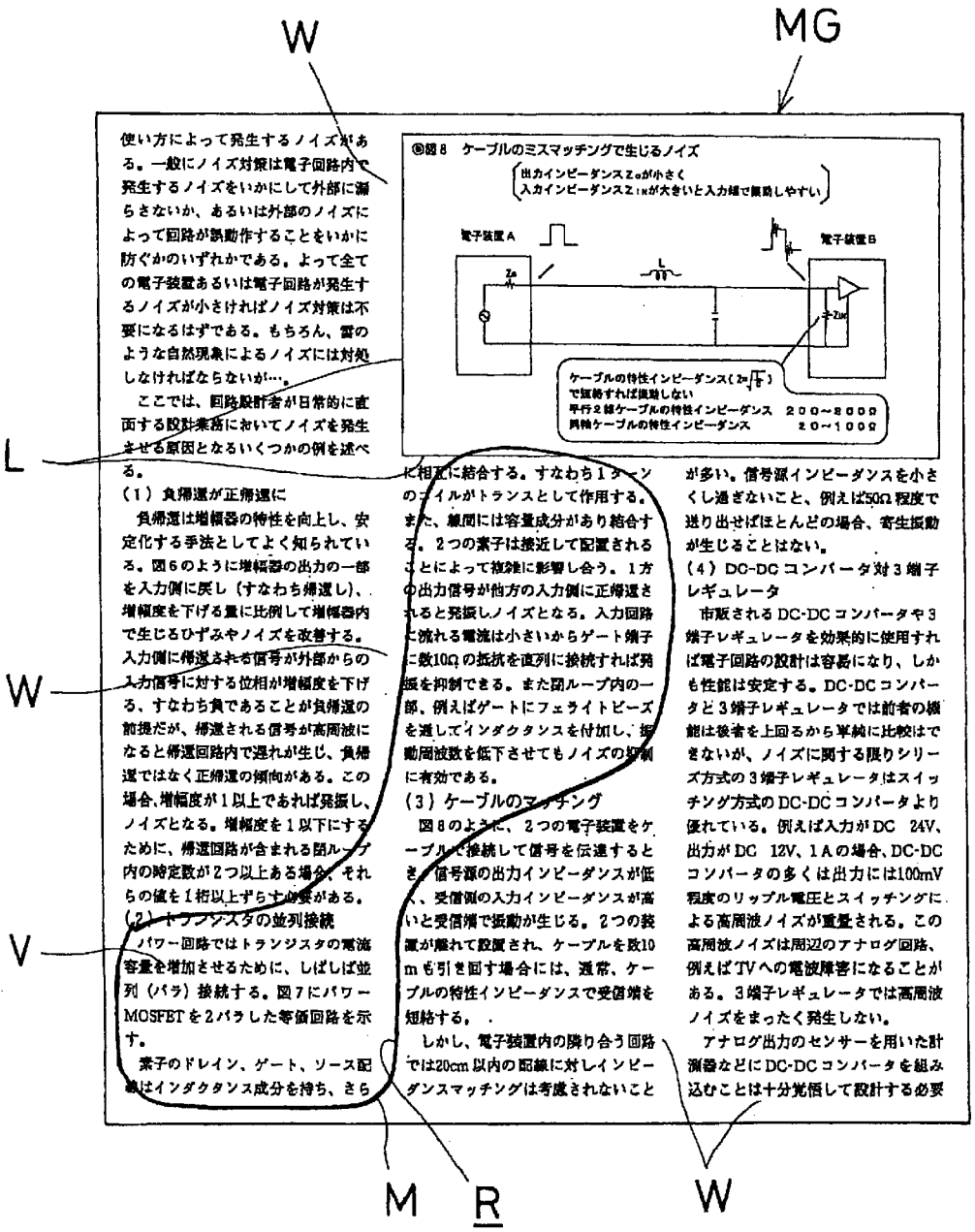
FIG. 10 describes the trimming region specification state of a second example of the trimming process of the present invention.

The image allocator 93 allocates the image into a plurality of blocks (refer to FIGS. 7, 8, 11, 12) based on the line segments (ruled lines) L and white space W within the image, as shown in FIGS. 6 and 10. In the present embodiment, block allocation is accomplished in two stages, although the block allocation method is not limited to the two-stage method.

The context determining unit 94 determines whether or not the context between two blocks is appropriate or not using the text recognition result of the text recognition unit 92.

The discriminator 95 determines whether or not blocks allocated by the image allocator 93 are included in the closed-region R. Regarding a block having a part of the block included in the closed-region R (i.e., a block on the boundary of the closed-region R), the discriminator 95 determines the image of the block is an image belonging to the closed-region R if the context is appropriate in accordance with the determination result of the context determining unit 94, and determines the image of the block is an image belonging to the region outside the closed-region R if the context is inappropriate.

The image eraser 96 retains the image belonging to the closed-region R and erases the image belonging to the region outside the closed-region R in accordance with the discrimination result of the discriminator 95.

The sequence of the trimming process executed in the trimming processor 90 is described below with reference to the flow chart of FIG. 3. In the following description and in the drawings, "step" is abbreviated by the reference symbol S.

In S1, the closed-region detector 91 detects a linear region circumscribed by the special color of the circumscribing mark M, i.e., the closed-region (trimming region) R, e.g., as shown in FIGS. 6 and 10, from image data stored in the image memory 31.

In S2, the ruled line cutout process is executed by the image allocator 93. This process is a process for cutting out ruled lines by tracking linearly connected items of black pixels of specific width and specific length of longer. In S3, a white space detection process is executed. This process is a process for detecting white space by tracking empty white areas of specific width or greater and specific length or greater after a black pixel enlargement process has been executed to embed the white space of text lines from text detected by the text recognition unit 92.

Figure 7:
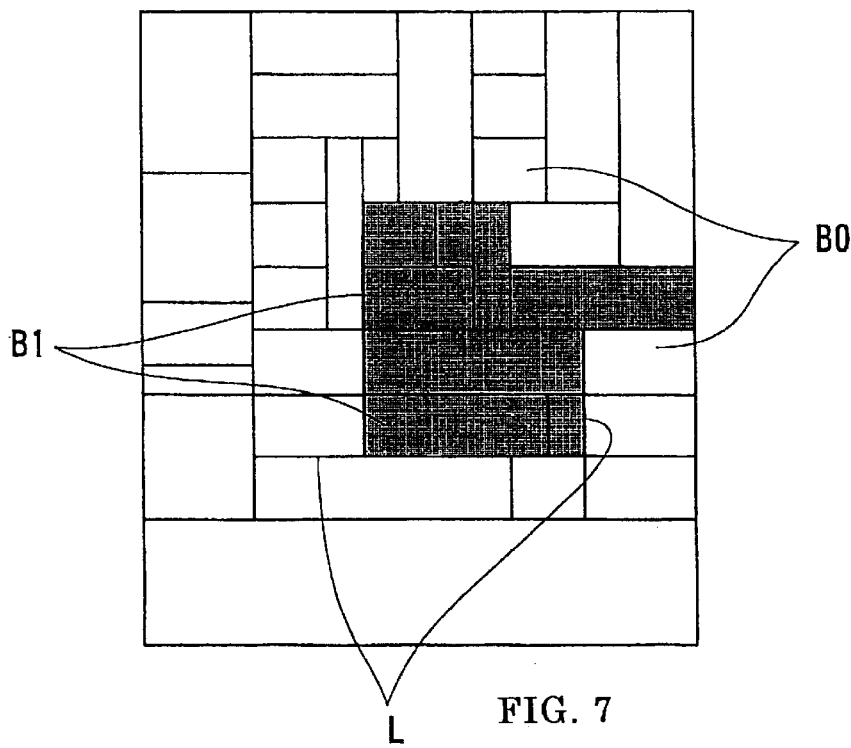
FIG. 7 illustrates the allocation state of the image of FIG. 6 subjected to a primary block allocation process.
Figure 11:
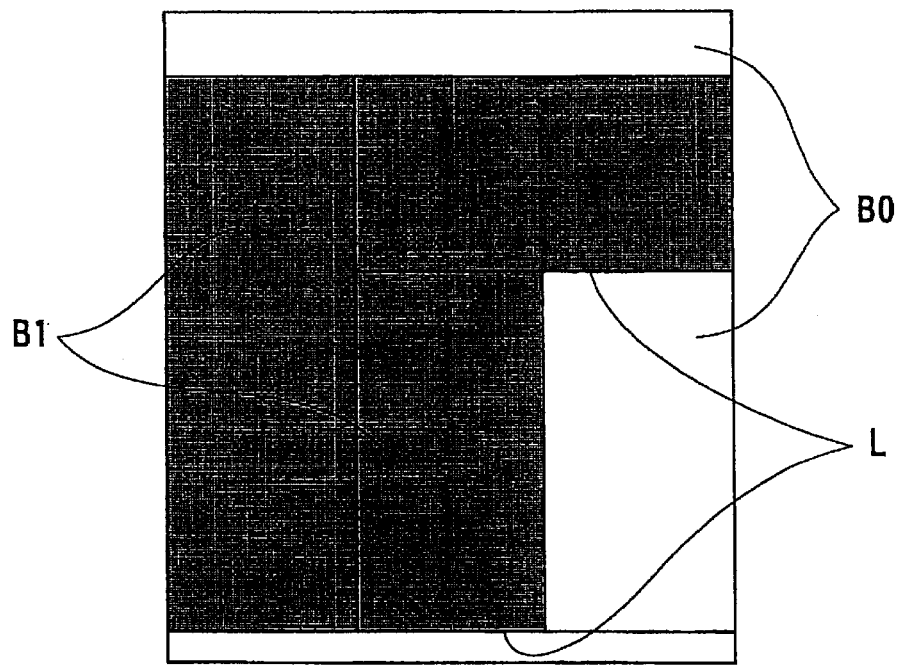
FIG. 11 shows the allocation state of the image of FIG. 10 subjected to a primary block allocation process.

In S4, the image allocator 93 executes a primary block allocation process to allocate the image into a plurality of blocks circumscribed by ruled line L and white space W as shown in FIGS. 7 and 11 in accordance with the detection results of the ruled line cutout process and the white space detection process.

In S5, a primary trimming process is executed. That is, the discriminator 95 discriminates the block completely included in the closed-region R, the blocks partially included in the closed-region R, and the blocks completely outside the closed-region R based on the detection result of the closed-region detector 91. The image eraser 96 erases the blocks completely outside the closed-region R based on the aforesaid result.

In S6, the image allocator 93 executes a secondary block allocation process to subdivide blocks extracted by the primary trimming process. In this case, subdivision is accomplished by, for example, setting a text line satisfying the conditions below as a boundary.

(A) Indent at the head of the text line.
(B) A numeral or symbol corresponding to a section number is present at the head of the text line.
(C) A symbol representing sentence punctuation, e.g., a period or punctuation marks, is present at the end of the text line.

In S7, the context determining unit 94 executes an inter block relevance detection process. Although details of this process are described later, the process essentially comprises determining the degree of connectedness of sentences of a block clearly determined to be a trimming target block, i.e., a block completely included in the closed-region R and a block partially included in the closed-region R, so as to determine whether or not to treat the block partially included in the closed-region R as a trimming target, i.e., an image belonging to the trimming region.

In S8, a secondary trimming process is executed. That is, the discriminator 95 discriminates whether or not an image belongs to the closed-region R in block units generated by the secondary block allocation process. A block completely included in the closed-region R is determined to be a block belonging to the closed-region R unconditionally. A block partially included in the closed-region R is comprehensively judged from the area ratio (part within the closed region/total region of block), and the degree of connectedness (presence of continuous word and phrase relevance and number of duplicate words) of sentences within block completely included in the closed region R. The image of blocks outside blocks determined to be belong to the closed-region R is erased by the image eraser 96. The circumscribing mark M is also erased. Accordingly, only the image of the blocks determined to belong to the closed-region R remains.

The image data within the image memory 31 are subjected to the trimming process, and this process completes the image output preparation for image output to the page printer PRT.

Figure 3:
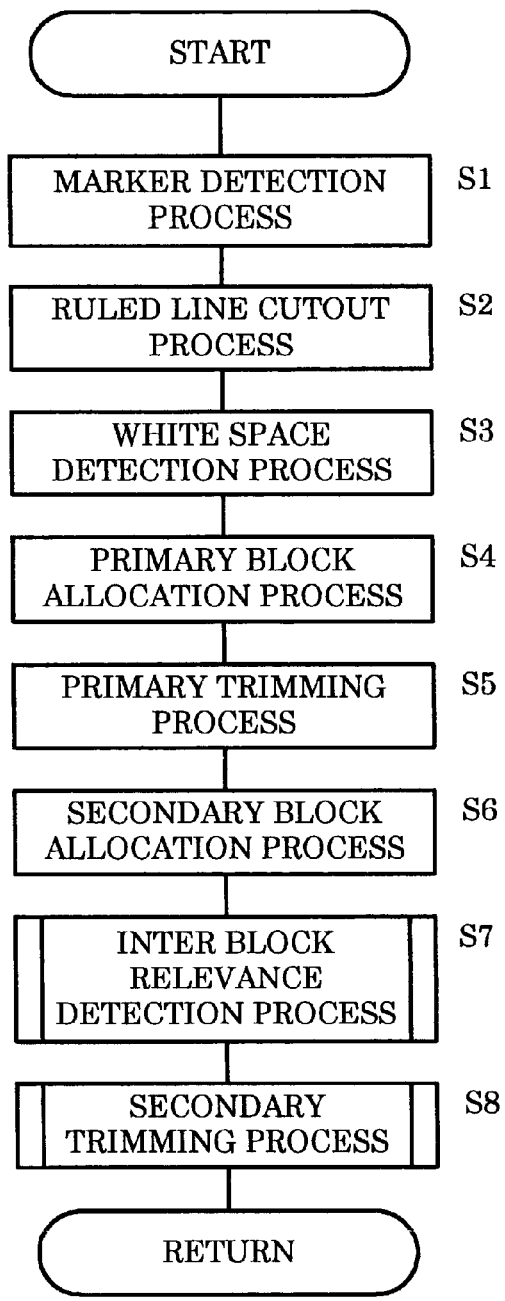
FIG. 3 is a flow chart showing the sequence of the trimming process performed by the trimming processor.
Figure 4:
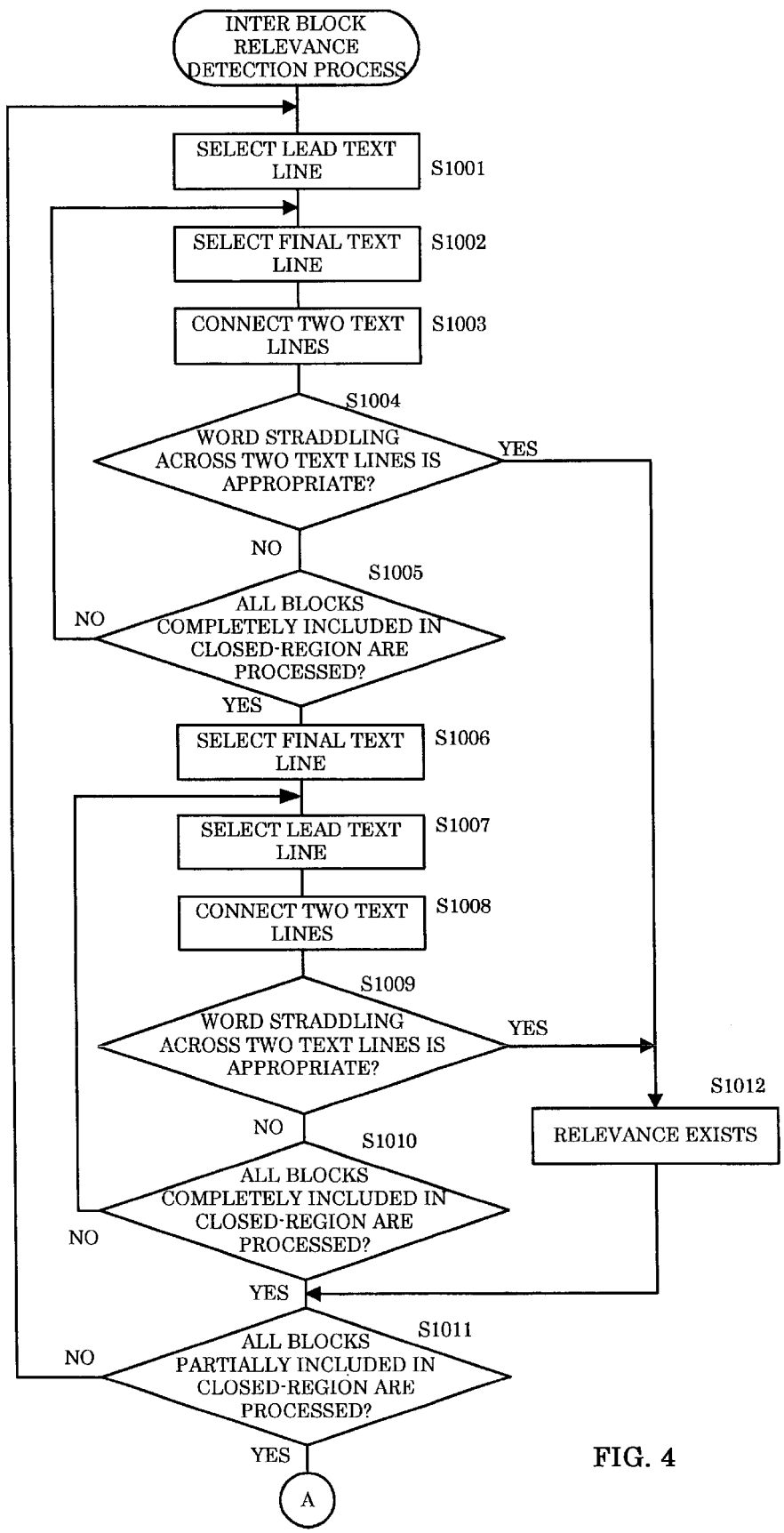
FIG. 4 is a flow chart showing the sequence of the first part of the inter block relevance detection process of FIG. 3.

FIG. 4 is a flow chart showing the sequence of the first half of the inter block relevance detection process of S7 in FIG. 3.

In S1001, a block partially included in the closed-region R is selected from among blocks allocated by the secondary block allocation process, and the lead text line is extracted. Then, in S1002, a block completely included in the closed-region R is selected, and the final text line is extracted. In S1003, the lead text line and the final text line are connected.

In S1004, a determination is made as to whether or not a word or phrase straddling across the two connected text lines (a word or phrase at the position of the joining of the two text lines) is an appropriate word or phrase, referring to the dictionary. Specifically, when a word or phrase matches any word or phrase recorded in the dictionary, the word or phrase is judged to be appropriate. When the word or phrase straddling across the two text lines is judged to be appropriate (S1004: YES), it is determined that there is relevance between the two blocks (S1012). Blocks linked in context with the blocks completely included in the closed-region R are extracted from among the blocks having a lead text line included in the closed-region R by the process.

When the word or phrase straddling across the two text lines is inappropriate, i.e., when the word or phrase does not match any word or phrase in the dictionary (S1004: NO), then in S1005 a determination is made as to whether or not all blocks completely included in the closed-region R have been processed. When all such blocks have not been processed (S1005: NO), the routine returns to S1002 and a new block is selected, and the processing of S1002 to S1005 are repeated.

When all blocks completely included in the closed-region R have been processed, i.e., when no appropriate word or phrase straddling across the two text lines can be detected in all blocks (S1005: YES), then in S1006 the final text line of a block partially included in the closed-region R is extracted, and thereafter, in S1007, the lead text line of a block completely included in the closed-region R is extracted, and in S1008 the two text lines are connected.

In S1009, a determination is made as to whether or not a word or phrase straddling across the two text lines (a word or phrase at the position of the joining of the two text lines) is an appropriate word or phrase, referring to the dictionary, and when it is judged to be appropriate (S1009: YES), it is determined that there is relevance between the two blocks (S1012). Blocks linked in context with the blocks completely included in the closed-region R are extracted from among the blocks having a latter part included in the closed-region R by the process.

On the other hand, when the word or phrase straddling across the two text lines is inappropriate (S1009: NO), then in S1010 a determination is made as to whether or not all blocks completely included in the closed-region R have been processed. When all such blocks have not been processed (S1010: NO), the routine returns to S1007 and a new block is selected, and the processing of S1007 to S1010 are repeated.

When all blocks completely included in the closed-region R have been processed, i.e., when no more appropriate word or phrase straddling across the two text lines can be detected in all blocks (S1010: YES), then in S1011 a determination is made as to whether or not all blocks partially included in the closed-region R have been processed. When all blocks partially included in the closed-region R have not been processed (S1011: NO), the routine returns to S1001, a new block is selected, and the processes (S1001 to S1011) are repeated.

Figure 5:
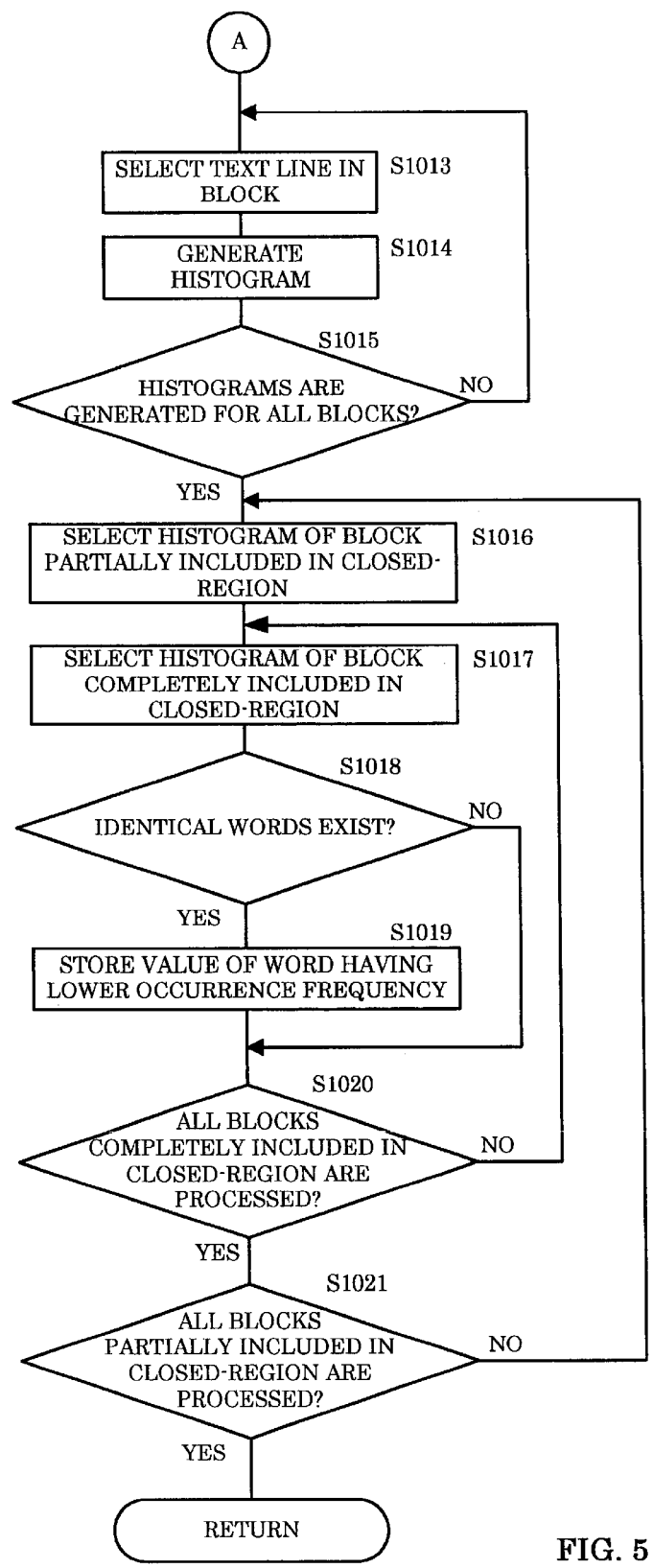
FIG. 5 is a flow chart showing the sequence of the last part of the inter block relevance detection process of FIG. 3.

FIG. 5 is a flow chart showing the sequence of the latter half of the inter block relevance detection process.

In S1011, when the processing (S1001 to S1011) has been executed for all blocks partially included in the closed-region R (S1011: YES), then after a text line in a block is selected in S1013, in S1014 a histogram of words and phrases and frequency of their occurrence is generated for all blocks generated by the secondary block allocation process (S6 of FIG. 3).

In S1015, a determination is made as to whether or not histograms have been generated for all blocks, and when histograms have not been generated for all blocks (S1015: NO), the routine returns to S1013 and the processes of S1013 to S1015 are repeated until histograms are generated for all blocks. When histograms have been generated for all blocks (S1015: YES), in S1016 a histogram of a block partially included in the closed-region R is selected, and thereafter in S1017 a histogram of a block completely included in the closed-region R is selected.

In S1018, the histogram of block partially included in the closed-region R and the histogram of block completely included in the closed-region R are compared, and a determination is made as to whether or not identical words and phrases are present. When identical words and phrases are present (S1018: YES), in S1019 the values of words and phrases having lower occurrence frequency are stored as the number of duplicate words and phrases. In S1020, a determination is made as to whether or not this process has been executed for all blocks completely included in the closed-region R. When identical words and phrases are not present (S1018: NO), the routine advances directly to S1020.

When all blocks completely included in the closed-region R have been processed in the determination of S1020 (S1020: YES), the routine advances to S1021. When all blocks have not been processed (S1020: NO), the routine returns to S1017 and the processes of S1017 to S1020 are repeated until all blocks completely included in the closed-region R have been processed.

In S1021, a determination is made as to whether or not all blocks partially included in the closed-region R have been processed, and when all blocks have been processed (S1021: YES), the routine returns. However, when all blocks have not been processed (S1021: NO), the routine returns to S1016 and a histogram of a new block is selected, and the processes of S1016 to S1021 are repeated until all blocks partially included in the closed-region R have been processed.

Blocks partially included in the closed-region R are subjected to detection of duplicate words and phrases and determination of the presence of relevance with blocks completely included in the closed-region R via the inter block relevance detection process, and the secondary trimming process (S8 of FIG. 3) is executed This trimming process is summarized as follows:

The image of the document having a circumscribing mark made using a marker such as a felt pen or the like is read by the image reader IR, and the closed-region R circumscribed by the circumscribing mark is detected as the trimming region. The document image is allocated into a plurality of blocks depending on the state of ruled lines and white space. Then, text information of the allocated blocks is recognized by the text recognition unit 92, and blocks partially included in the closed-region R are examined by the context determining unit 94 to determine the relevance, i.e., linked context, with blocks completely included in the closed-region R. If the context is appropriate, the image of the block is retained as an image belonging to the trimming region, and if the context is inappropriate, the image of the block is erased as an image outside the trimming region.

In this way the trimming process determines a desired trimming region accurately even by rough marking of the region, without losing part of the image.

Specific examples of trimming are described below.

A first example describes trimming an image V within a closed-region R circumscribed by a circumscribing mark M in a newspaper NP shown in FIG. 6.

When the primary block allocation process is executed on the image NP, the image is processed in the state shown in FIG. 7. That is, in this primary block allocation process, the image is allocated into the plurality of blocks shown in FIG. 7 by the ruled line L cutout process and the white space W detection process shown in FIG. 6. Then, the image of the blocks B1 (gray areas) completely or partially included in the closed-region R is retained, and the image of other blocks B0 (white areas) is erased by the primary trimming process.

Figure 8:
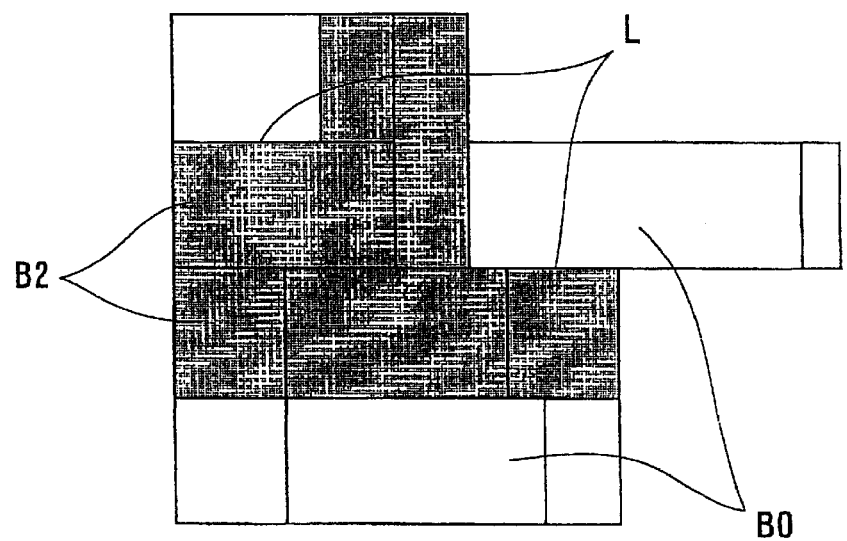
FIG. 8 shows the subdivision state of blocks of FIG. 7 subjected to a secondary block allocation process.
Figure 9:
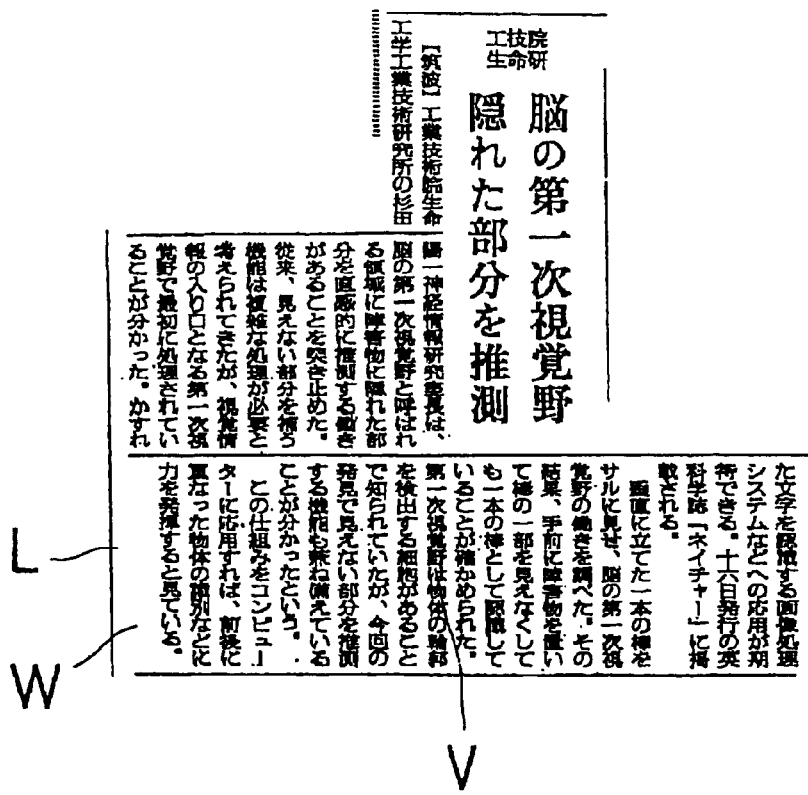
FIG. 9 illustrates the image ultimately obtained by the inter block relevance process on the image of FIG. 7.

Next, the image retained by the primary trimming process is subjected to a secondary block allocation process, so as to subdivide the blocks into a plurality of blocks as shown in the enlargement of FIG. 8. Finally, the image corresponding to the gray blocks B2 of FIG. 8 is output as the trimming process result, and the desired image V is obtained as shown in FIG. 9.

A second example describes trimming an image V within a closed-region R circumscribed by a circumscribing mark M in a magazine MG shown in FIG. 10.

When the primary block allocation process is executed on the image MG, the image is processed in the state shown in FIG. 11. That is, in this primary block allocation process, the image is allocated into the plurality of blocks shown in FIG. 11 by the ruled line L cutout process and the white space W detection process shown in FIG. 10. Then, the image of the block B1 (gray areas) completely or partially included in the closed-region R is retained, and the image of other blocks B0 (white areas) is erased by the primary trimming process.

Figure 12:
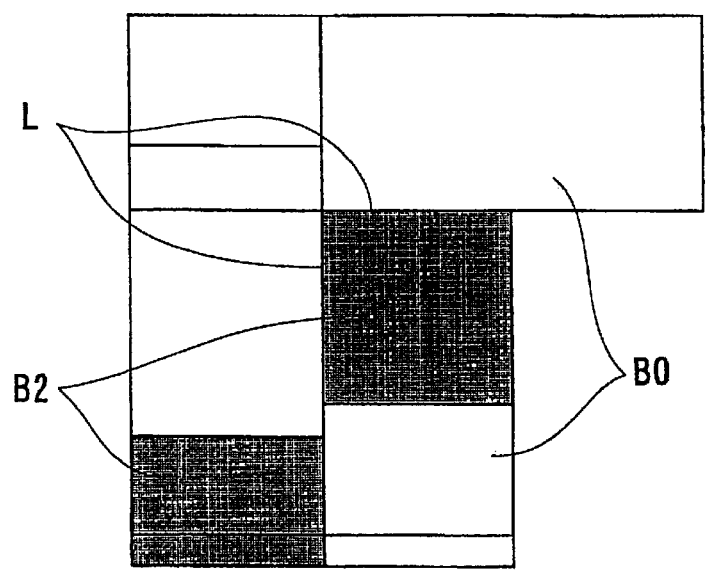
FIG. 12 shows the subdivision state of blocks of FIG. 11 subjected to a secondary block allocation process.

Next, the image retained by the primary trimming process is subjected to a secondary block allocation process, so as to subdivide the blocks into a plurality of blocks as shown in the enlargement of FIG. 12. Finally, the image corresponding to the gray blocks B2 of FIG. 12 is output as the trimming process result, and the desired image V is obtained as shown in FIG. 13.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

For example, although the trimming region is specified by appending a circumscribing mark M on a document image using a marker such as a felt pen or the like in the above described embodiments, the specification of the trimming region is not limited to this method inasmuch as, for example, region specification also may be accomplished by pen input or touch screen operation on a display screen or tablet, or coordinates may be input using a ten-key pad or the like as a numerical specification.

The trimming process for retaining an image belonging to the closed-region R is provided as an example in the aforesaid embodiments, but the present invention also is applicable to image processes other than trimming. For example, the present invention is applicable to a masking process for erasing the image belonging to the closed-region R and retaining the image outside the closed-region R.

Although the copier 1 executes image processing on an image read by the image reader IR itself in the aforesaid embodiments, it is also possible to connect the copier 1 to a network, and execute image processing on the image (data) received from an external device over the network. The present invention is applicable not only to copiers, but also to other types of devices such as printers, facsimiles and the like.

Although examples of the image processing of the present invention performed by the hardware circuits of a trimming processor 90 have been described in the aforesaid embodiments, the image processing of the present invention also may be executed by loading a software program in a computer to execute the processes shown in the examples of FIGS. 3 to 5. In this case the present invention can be treated as a software program for making a computer execute the image processing.

What is claimed is:

1. An image processing device comprising:
   a detector for detecting a specific region within an image to be processed;
   an image allocator for allocating the image to be processed into a plurality of blocks;
   a text recognizing unit for recognizing text included in the image to be processed;
   a first determining unit for, on the basis of a recognition result of the text recognizing unit, determining presence and absence of relevance between a first block which is partially included in the specific region and a second block which is entirely included in the specific region among a plurality of blocks allocated by the image allocator; and
   a second determining unit for determining whether or not an image of the first block should be treated as an image belonging to the specific region in accordance with a determination result of the first determining unit, wherein the second determining unit determines that the image of the first block should be treated as the image belonging to the specific region when the first determining unit has determined that there is relevance between the first block and the second block.

2. An image processing device as claimed in claim 1, further comprising an image processor for performing specific image processing on the specific region or regions outside the specific region based on a determination result of the second determining unit.

3. An image processing device as claimed in claim 2, wherein the specific image processing is erasure of the image.

4. An image processing device as claimed in claim 1, wherein the first determining unit determines whether or not a context is appropriate between an article comprised of text belonging to the first block and an article comprised of text belonging to the second block, and determines there is relevance between the first block and the second block when the context is appropriate.

5. An image processing device as claimed in claim 4, wherein the first determining unit has a dictionary recording a plurality of words and phrases, and determines the context is appropriate when a word or phrase straddling across a final or leading text line belonging to the first block and a leading or final text line belonging to the second block matches any words and phrases recorded in the dictionary.

6. An image processing device as claimed in claim 1, wherein the image allocator allocates the image to be processed based on lines within the image to be processed.

7. An image processing device as claimed in claim 1, wherein the image allocator allocates the image to be processed based on white spaces within the image to be processed.

8. An image processing device as claimed in claim 1, wherein the detector detects a closed region circumscribed by a line of specific color within the image to be processed as the specific region.

9. An image processing device as claimed in claim 1, further comprising an image reader for reading a document image to obtain data of the image to be processed.

10. A computer program product for making a computer execute processing which comprises the steps of:
   1) detecting a specific region within an image to be processed;
   2) allocating the image to be processed into a plurality of blocks;

3) recognizing text included in the image to be processed;

4) on the basis of a result of recognition at the step 3, determining presence and absence of relevance between a first block which is partially included in the specific region and a second block which is entirely included in the specific region among a plurality of blocks allocated at the step 2; and 5) determining whether or not an image of the first block should be treated as an image belonging to the specific region in accordance with a result of determination at the step 4, wherein it is determined at the step 5 that the image of the first block should be treated as the image image belonging to the specific region when it has been determined at the step 4 that there is relevance between the first block and the second block.

11. A computer program product as claimed in claim 10, wherein the processing further comprises a step of performing specific image processing on the specific region or regions outside the specific region based on a result of determination at the step 5.

12. A computer program product as claimed in claim 11, wherein the specific image processing is erasure of the image.

13. A computer program product as claimed in claim 10, wherein at the step 4, it is determined whether or not a context is appropriate between an article comprised of text belonging to the first block and an article comprised of text belonging to the second block, and it is determined that there is relevance between the first block and the second block when the context is appropriate.

14. A computer program product as claimed in claim 13, wherein at the step 4, a dictionary recording a plurality of words and phrases is referred, and it is determined that the context is appropriate when a word or phrase straddling across a final or leading text line belonging to the first block and a leading or final text line belonging to the second block matches any words and phrases recorded in the dictionary.

15. A computer program product as claimed in claim 10, wherein the image to be processed is allocated at the step 2 based on lines within the image to be processed.

16. A computer program product as claimed in claim 10, wherein the image to be processed is allocated at the step 2 based on white spaces within the image to be processed.

17. A computer program product as claimed in claim 10, wherein a closed region circumscribed by a line of specific color within the image to be processed is detected as the specific region at the step 1.

18. A computer program product as claimed in claim 10, wherein the processing further comprises a step of reading a document image to obtain data of the image to be processed.

* * * * *